Patented Apr. 16, 1935

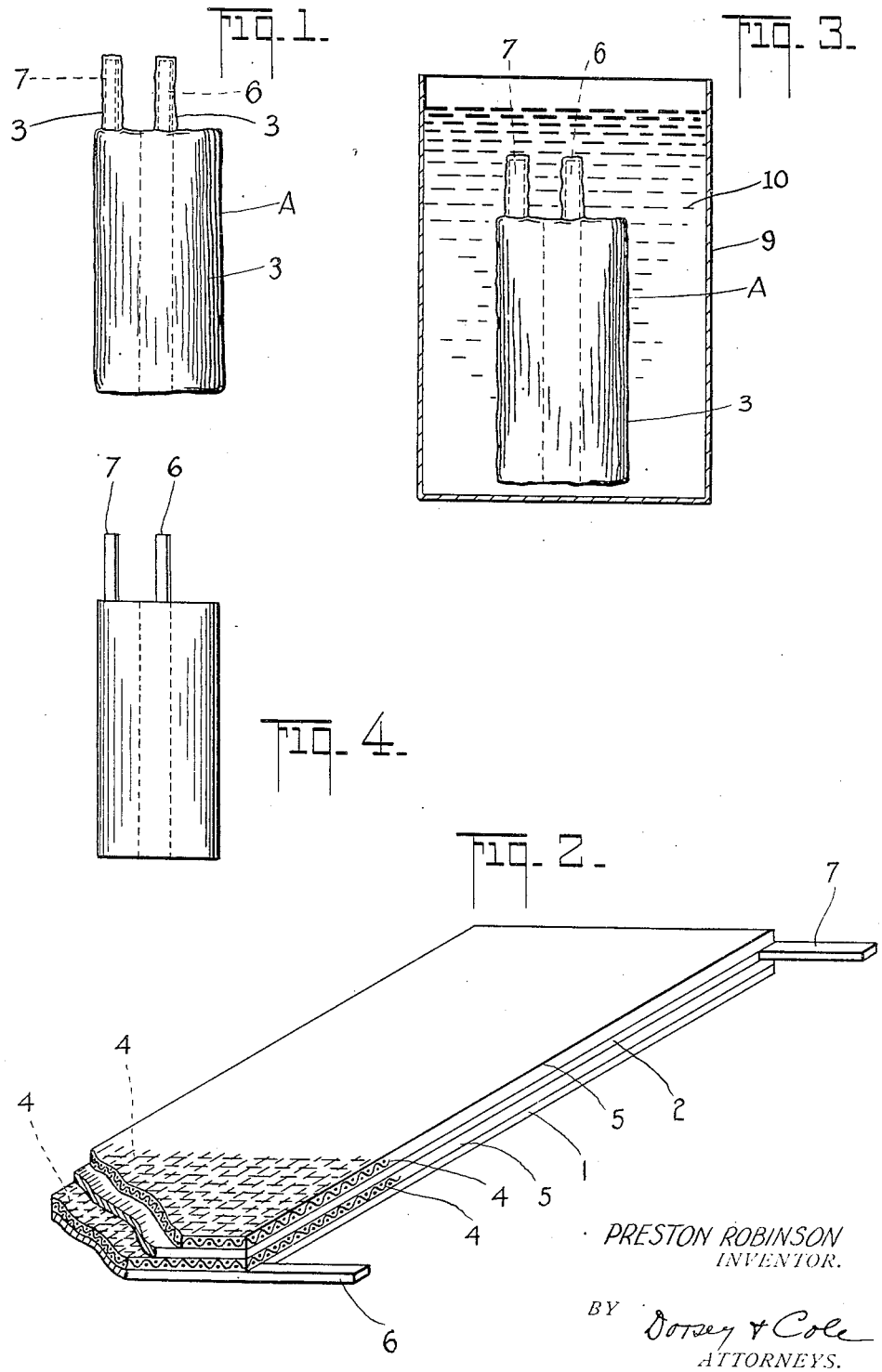

1,998,202

UNITED STATES PATENT OFFICE 1,998,202

MANUFACTURE OF ELECTROLYTIC CONDENSERS

Preston Robinson, North Adams, Mass., assignor to Sprague Specialties Company, North Adams, Mass., a corporation of Massachusetts Application August 3, 1933, Serial No. 683,514

13 Claims.  (Cl. 175—315)

The present invention relates to electrolytic condensers and particularly to condensers having a highly viscous or pasty electrolyte, which condensers are generally referred to as dry electrolytic condensers.

Such condensers comprise, as a rule, two metal foil electrodes, at least one of which is of filming material; for instance, of aluminum, tantalum, zirconium, etc., while the other may be of filming or non-filming material.

One or both electrodes are provided with an electrolytically-formed oxide film, and between the electrodes is interposed a more or less viscous electrolyte.

Between the electrodes there is also provided as a rule, a porous or absorbent spacer; for instance, a gauze spacer, which also serves as a carrier for the electrolyte.

The electrolyte as a rule comprises a weak acid, for instance, boric acid, phosphoric acid, citric acid, etc., a salt of a weak acid, which, however, does not need to be the salt of the acid used, an ionizing agent, which comprises as a rule a polyhydric alcohol, for instance glycerine, ethylene glycol, dextrose, etc., and a given amount of water. The electrolyte may also comprise one or more inert substances which may serve to increase its viscosity.

The condenser as a rule forms a roll, and to the electrode foils are connected terminal leads for the outside connection of the condenser; instead of providing separate terminal leads these may be formed by integral portions of the electrode foils.

To maintain the original moisture content of the electrolyte and to prevent contamination and mechanical injury of the condensers, the condenser rolls are usually enclosed in containers.

The carrier is impregnated with the electrolyte either before or after the condenser is wound.

According to the first method, the spacers are soaked in the electrolyte and the electrode foils with the two spacers inserted between the same, are wound together into a roll. This method requires comparatively slow and expensive manual operations and also results in a considerable waste of the electrolyte. Besides that, the handling and proper alignment of the soaked spacer is comparatively difficult. Altogether this method is not well suited for large scale production.

According to the second method, the spacers, without being impregnated, are wound with the electrodes into a roll, and these wound condenser rolls are subjected to impregnation in a suitable tank.

As with the unimpregnated spacers the condensers can be wound into rolls on winding machines, more accurate spacing of the members can be obtained and as the cumbersome handling of impregnated spacers is eliminated, this method is better adapted for mass production.

In both methods, and especially in the second method, however, the drawback exists that the finished condenser carries on its outside a heavy and irregular crust of electrolyte. Besides, when the second method is used the terminal connections are also covered with a heavy electrolyte layer. Furthermore, if the roll is wound on a removable mandrel the corresponding axial cavity of the condenser is also filled out with electrolyte during the impregnation. This excess of electrolyte, covering the condenser and filling out said cavity, represents a considerable waste of electrolyte material. Besides, the outer electrolytic crust being thick and irregular, it unduly increases the overall dimensions of the condenser, requires a correspondingly larger casing, which besides the additional expense, is highly objectionable in all applications of the condensers where small size is of paramount importance. Also the irregular contour of the condensers makes the assembly work more difficult.

Furthermore, the removal of the electrolyte layer from the terminal leads, requires a separate manual operation, for instance, the scraping of these leads, which not only adds to the cost of the condenser, but in view of the thinness of the metal foils, their projecting portions may be easily damaged in this operation.

According to my invention the condenser after its impregnation, is subjected to treatment with a solution which removes all of the excess of electrolyte from the outer surface of the condenser and from its central cavity, if there is such, as well as from the terminal leads, without at the same time in any way affecting the electrolyte inside the condenser.

While it seems rather obvious to remove such excess of electrolyte from the condenser by means of a solvent, all attempts in the past have been unsuccessful.

For instance, if water were used as the solvent, the water would also act as a solvent for the electrolyte within the condenser and increase the water content of same,—and as has been fully set forth in my application Ser. No. 548,270, filed July 1, 1931, the water content of the condenser greatly affects the characteristics of the condenser and is to be kept within well-defined and comparatively narrow limits.

Also, the other well-known solvents, as alcohol, ether, acetone, etc., are unsuitable for the above purpose. These solvents either attack the electrolyte or change the content of its solvent, or again, merely dilute the adhering electrolyte layer, without actually removing same.

I have found that with the types of electrolytes now generally used, this cleaning or removal can be accomplished without any drawback by using as a solvent the solutions of certain acids.

As stated, present day dry condensers, as a rule, have an electrolyte which comprises a weak acid, for instance, boric acid, phosphoric acid, citric acid, etc., and usually also a salt of such a weak acid, which salt, however, does not need to be the salt of the acid used. The ionizing solvent of the electrolyte comprises a polyhydric alcohol; for instance, glycerine, ethylene glycol, dextrose, etc., and in addition water, which preferably constitutes 15 to 25% of the total solvent used. In addition, the electrolyte may comprise an inert material, for instance, bentonite, starch, silica gel, or boric acid, mainly for increasing the viscosity of the electrolyte.

I have found that in such an electrolyte, when it is in a stable condition, which condition also gives the best characteristics to the condenser, a considerable proportion of the polyhydric alcohol and of the weak acid are present in the form of an ester of these two components. However, if further water is added to the electrolyte, this water hydrolizes the ester back into its alcohol and acid components. Thus the addition of water radically changes the character of the electrolyte.

I found, however, that by adding to water the acid of the above ester and preferably by providing a saturated aqueous solution of this acid, such hydrolizing action of the water in this solution is prevented, whereas at the same time the solution will remove all excess electrolyte adhering to the condenser.

Instead of using as a cleaning solution a saturated aqueous solution of the same acid as that forming the ester in the electrolyte, the saturated aqueous solution of another acid may be used provided this acid of the solution is weaker than the acid forming the ester. Thus if the ester is glyceryl-phosphoric acid, the aqueous solution may be saturated with boric acid, since boric acid is a weaker acid than is phosphoric acid.

According to my invention, after the impregnation of the condenser, I subject same to a chemical treatment consisting of an immersion in an aqueous solution and preferably in a saturated solution of the acid used in the electrolyte; for instance, if the electrolyte comprises boric acid or phosphoric acid, which in the stable electrolyte forms an ester with the polyhydric alcohol of the electrolyte, I use for this treatment a saturated aqueous solution of boric acid or phosphoric acid respectively, or I may use in both cases boric acid. However, if the electrolyte comprises boric acid, it is not desirable to use an aqueous solution of phosphoric acid for cleaning.

My invention will be described on hand of the attached drawing forming part of the specification and in which:

Figure 1 is a side view of a dry condenser after its impregnation, but before its chemical treatment according to the invention.

Fig. 2 is a portion of the condenser 1 shown in development.

Fig. 3 is a side view partly in section, showing the impregnated condenser immersed in a bath for the chemical removal of the excess electrolyte according to the invention.

Fig. 4 is a side view of the condenser after its removal from the bath.

The condenser consists of two electrode foils 1 and 2, of which at least one is of film-forming metal, for instance, aluminum, tantalum, zirconium, etc., and is provided with an electrolytically formed film, which film is a partially hydrated oxide film, and is preferably formed on the electrode, prior to its assembly in the condenser. In case the condensers are used for rectified current, only one electrode needs to have a film; however, for alternating current both electrodes are provided with a film. The formation of the film preferably takes place by the method described in my copending application Ser. No. 548,270 filed July 1, 1931.

Two spacers 4—4 are wound together with the electrode foils into a roll. These spacers, which preferably consist of narrow mesh gauze, act as the carrier for the electrolyte 5.

The electrolyte comprises a weak acid, for instance, boric acid, phosphoric acid, citric acid, etc., and preferably, also, a salt of a weak acid which, however, does not need to be the salt of the acid used; such salts are as a rule ammonium,—sodium,—potassium—etc., salts of weak acids.

The ionizing solvent of the electrolyte comprises a polyhydric alcohol, for instance, glycerine, ethylene glycol, dextrose, etc., and also water, the water being preferably about 15 to 25% of the solvent used. In addition an inert substance, for instance, bentonite, starch, silica gel, boric acid, etc., may be used, mainly to further reduce the fluidity of the electrolyte.

As shown in the drawing, the electrodes 1 and 2 are provided with integral projecting portions 6 and 7 respectively which serve as terminal leads for the outside connection of the condenser. Instead of making the terminal connections as integral portions of the electrodes, separate leads may be connected to the electrodes. However, as a rule it is preferable to make the terminal leads as integral portions of the electrode.

As appears from Fig. 1, after its impregnation, the condenser is covered on the outside with an electrolytic layer forming a comparatively heavy and irregular crust which also covers the terminal leads and when the condenser has been wound on a mandrel, also fills out its axial cavity corresponding to the mandrel.

In accordance with my invention, for the removal of this excess electrolyte from the condenser and from the terminal leads, the impregnated condenser is subjected to a chemical treatment which consists in its dipping into a container 9 which comprises an aqueous solution and preferably a saturated aqueous solution of the weak acid used in the electrolyte of the condenser, although the saturated aqueous solution of an acid which is weaker than the acid of the electrolyte may also be used. Thus, if boric acid is the acid of the electrolyte, the solution 10 in container 9 is a saturated aqueous solution of boric acid. If phosphoric acid is the acid of the electrolyte, the solution as stated, may be phosphoric acid or boric acid, the latter being a weaker acid than phosphoric acid.

It should be noted that for the reasons above stated the solution of the bath does not attack the electrolyte inside of the condenser. The solution of the weak acid does not chemically attack the electrolyte and its removal within the condenser is prevented, as it is physically held within the spacer.

Due to this treatment the excess electrolyte on the outside of the condenser and on the terminals (and, if the condenser has a hollow filled with electrolyte, this electrolyte too) mixes with the solution. On the other hand the electrolyte, which is mechanically retained between the electrode foils, is held there to a sufficient extent that it does not mix with the cleaning solution. Since there is no chemical reaction between the solution and the electrolyte, the electrolyte in the condenser remains substantially unchanged during this treatment. The result is that the condenser proper with the electrolyte between the foils remains unchanged, whereas on its outer surface and the leads the condenser is cleaned from the excess electrolyte and covered with a thin film of the boric acid solution.

The treatment is of short duration and a few seconds suffice as a rule. The temperature of the bath 10 is preferably between 50° and 80° C., although both lower and higher bath temperatures may be successfully employed.

The bath 10 becomes gradually saturated with the electrolyte removed from the condensers and after treating a comparatively large number of condensers, a fresh bath is used. If during the repeated use of the cleaning solution, the solution becomes unsaturated with respect to boric acid, it may be again saturated by the addition of excess solid boric acid. The electrolyte can be recovered from the bath by various methods, for instance, the water is evaporated from the electrolyte and by simple, known chemical processes the electrolyte is made suitable to be used as impregnating electrolyte.

The condensers when removed from the electrolyte are subjected to drying, either by subjecting them to forced air draft, in which case the drying can be achieved in ten to fifteen minutes, or they may be dried in air in the regular way, which, however, may require several hours.

The condensers after their removal from the bath, have a smooth outer surface, as shown in Fig. 4, all of the excess electrolyte being removed from the outer surface of the condenser as well as from the terminal leads.

There might remain on the surface of the condenser as well as on the terminal leads a very thin layer of boric acid, which layer being of the order of a few ten thousandths of an inch, is negligible as far as the condenser goes, and which either flakes off from the terminal leads or when present serves as a flux in the soldering operation.

If the condensers are impregnated with a centrifugal impregnator, the impregnating electrolyte may be drained off—while the centrifuge is in motion—then the condensers subjected to spraying with a saturated aqueous solution of the weak acid, also preferably while the centrifuge is in motion, after which this solution is drained off and the condensers dried also with the centrifuge in motion.

The centrifugal impregnating device used in this connection does not form part of my present application and therefore it is not deemed to be necessary to illustrate it in this application.

While I have described my invention in connection with specific devices and in specific applications I do not wish to be limited to same, but desire the appended claims to be construed as broadly as permissible in view of the prior art.

What I claim as new and desire to secure by Letters Patent is:

1. In the manufacture of electrolytic condensers, the process which comprises the steps of assembling into a roll electrode foils and interposed spacers, impregnating said roll in an electrolyte comprising as major active constituents a weak acid and a polyhydric alcohol and also containing water, and removing the excess electrolyte from the condenser by subjecting same to a treatment in an aqueous solution of a weak acid.

2. In the manufacture of electrolytic condensers the process which comprises the steps of assembling into a roll electrode foils and interposed spacers, impregnating said roll in an electrolyte comprising as major active constituents a weak acid and a polyhydric alcohol and also containing water, and removing the excess electrolyte from the condenser by subjecting same to a treatment in an aqueous solution of the said weak acid.

3. In the manufacture of electrolytic condensers the process which comprises the steps of assembling into a roll electrode foils and interposed spacers, impregnating said roll in an electrolyte comprising as major active constituents a weak acid and a polyhydric alcohol and also containing water, and removing the excess electrolyte from the condenser by subjecting same to a treatment in an aqueous solution of a weak acid which is not stronger than the acid of the electrolyte.

4. In the manufacture of electrolytic condensers the process which comprises the steps of assembling into a roll electrode foils and interposed spacers, impregnating said roll in an electrolyte comprising as major active constituents a weak acid and a polyhydric alcohol and also containing water, and removing the excess electrolyte from the condenser by subjecting same to a treatment in an aqueous solution of an acid which is weaker than the acid of the electrolyte.

5. In the manufacture of electrolytic condensers, the process which comprises the steps of assembling into a roll electrode foils, of which at least one is provided with a preformed film, together with interposed absorbent spacers, impregnating said roll in an electrolyte which comprises as major active constituents a weak acid, a salt of a weak acid and a polyhydric alcohol and also containing water, and removing the excess electrolyte deposited on the exposed surfaces of the condenser by immersing same in a saturated aqueous solution of said first-mentioned weak acid.

6. In the manufacture of electrolytic condensers, the process which comprises the steps of assembling into a roll electrode foils, at least one of which has an electrolytically-formed film together with interposed absorbent spacers, impregnating said roll in an electrolyte which comprises as major active constituents a weak acid and a solvent comprising a polyhydric alcohol and 15 to 25% water, and removing the excess electrolyte deposited on the exposed portions of the condenser by submerging same into an aqueous solution of said weak acid.

7. In the manufacture of electrolytic condensers, the process which comprises the steps of assembling into a roll electrode foils and interposed spacers, impregnating said roll in an electrolyte which comprises as major active constituents a weak acid and a solvent comprising a polyhydric alcohol and also containing water, and removing the excess electrolyte deposited on the surface of the impregnated condenser by submerging it into a saturated aqueous solution of said weak acid.

8. In the manufacture of electrolyic condensers, the process which comprises the steps of assembling into a roll electrode foils and interposed spacers, impregnating said roll in an electrolyte which comprises as major active constituents a weak acid and a solvent comprising a polyhydric alcohol and also containing water, and removing the excess electrolyte deposited on the surface of the impregnated condenser by submerging it into a saturated aqueous solution of a weak acid which is no stronger than the acid used in the electrolyte.

9. In the manufacture of electrolytic condensers, the process which comprises the steps of assembling into a roll electrode foils and interposed absorbent spacers, impregnating said roll in an electrolyte which comprises as major active constituents boric acid and a solvent comprising a polyhydric alcohol and water, and removing the excess electrolyte from said condenser by dipping it into a saturated aqueous solution of boric acid.

10. In the manufacture of electrolytic condensers, the process which comprises the steps of assembling into a roll electrode foils and interposed absorbent spacers, impregnating said roll in an electrolyte which comprises as major active constituents a weak acid and a solvent comprising a polyhydric alcohol and water, and removing the excess elecrolyte from said condenser by dipping it for a few seconds into a bath comprising a saturated aqueous solution of a weak acid which is not stronger than the acid used in the electrolyte.

11. In the manufacture of electrolytic condensers, the process which comprises the steps of assembling into a roll electrode foils and interposed absorbent spacers, impregnating said roll in an electrolyte which comprises as major active constituents a weak acid and a solvent comprising a polyhydric alcohol and water, and removing the excess electrolyte from said condenser by dipping it for a few seconds into a bath comprising a saturated aqueous solution of said weak acid, said bath having a temperature of about 50° to 80° centigrade.

12. In the manufacture of electrolytic condensers, the process which comprises the steps of assembling into a roll electrode foils and interposed absorbent spacers, impregnating said roll in an electrolyte which comprises as major active constituents a weak acid and a solvent comprising a polyhydric alcohol and water, removing the excess electrolyte from said condenser by the immersion of said condenser in a bath comprising a hot saturated aqueous solution of said weak acid, and drying said condenser after its removal from said bath.

13. In the manufacture of electrolytic condensers, the process which comprises the steps of assembling into a roll electrode foils and interposed absorbent spacers, impregnating said roll in an electrolyte which comprises as major active constituents a weak acid which is stronger than boric acid and a solvent comprising a polyhydric alcohol and water, and removing the excess electrolyte from said condenser by dipping it into a saturated aqueous solution of boric acid.

PRESTON ROBINSON.